(12) United States Patent
Hattori et al.

(10) Patent No.: US 9,706,122 B2
(45) Date of Patent: Jul. 11, 2017

(54) IMAGE PROCESSING DEVICE, IMAGING DEVICE, MONITORING SYSTEM, ENCODING DEVICE, IMAGE PROCESSING METHOD

(71) Applicant: HITACHI KOKUSAI ELECTRIC INC., Tokyo (JP)

(72) Inventors: Hideharu Hattori, Tokyo (JP); Yuichiro Komiya, Tokyo (JP); Muneaki Yamaguchi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 79 days.

(21) Appl. No.: 14/768,772

(22) PCT Filed: Jan. 29, 2014

(86) PCT No.: PCT/JP2014/051964
§ 371 (c)(1),
(2) Date: Aug. 19, 2015

(87) PCT Pub. No.: WO2014/148114
PCT Pub. Date: Sep. 25, 2014

(65) Prior Publication Data
US 2016/0006936 A1    Jan. 7, 2016

(30) Foreign Application Priority Data

Mar. 21, 2013  (JP) .................................. 2013-057774
Apr. 5, 2013   (JP) .................................. 2013-079721

(51) Int. Cl.
G06K 9/36      (2006.01)
H04N 5/232     (2006.01)
(Continued)

(52) U.S. Cl.
CPC ......... *H04N 5/23267* (2013.01); *G06T 5/002* (2013.01); *G06T 5/003* (2013.01);
(Continued)

(58) Field of Classification Search
CPC  G06T 5/002; G06T 5/003; G06T 5/40; G06T 5/50; G06T 2207/10016;
(Continued)

(56) References Cited

U.S. PATENT DOCUMENTS 7,548,659 B2 *  6/2009  Ofek ...................... G06T 5/005
                                              348/208.99
8,254,677 B2 *  8/2012  Abe ....................... H04N 19/14
                                              348/402.1

(Continued)

FOREIGN PATENT DOCUMENTS

JP   2012-182625 A    9/2012
WO   2009146395 A1   12/2009

OTHER PUBLICATIONS

Extended European Search Report received in corresponding European Application No. 14770882.0 dated Jul. 12, 2016.
International Search Report of PCT/JP2014/051964.

*Primary Examiner* — Mekonen Bekele
(74) *Attorney, Agent, or Firm* — Mattingly & Malur, PC

(57) ABSTRACT

The purpose of the present invention is to provide image processing technology that can reduce shimmering in the entirety of images that include both still regions and moving bodies. This image processing device finds gradient distribution for each of a frame to be corrected and a frame for correction, changes, according to the degree of similarity in the gradient distribution, the proportion in which the frame to be corrected and the frame for correction are used, and then corrects the frame to be corrected using the frame for correction (see FIG. 1).

13 Claims, 13 Drawing Sheets

(51) Int. Cl.
   *G06T 5/00*     (2006.01)
   *G06T 5/40*     (2006.01)
   *G06T 5/50*     (2006.01)
   *H04N 19/186*   (2014.01)
   *H04N 19/63*    (2014.01)
   *H04N 5/21*     (2006.01)

(52) U.S. Cl.
   CPC ............... *G06T 5/40* (2013.01); *G06T 5/50* (2013.01); *H04N 5/21* (2013.01); *H04N 19/186* (2014.11); *H04N 19/63* (2014.11); *G06T 2207/10016* (2013.01); *G06T 2207/10024* (2013.01); *G06T 2207/20012* (2013.01); *G06T 2207/20212* (2013.01); *G06T 2207/30232* (2013.01)

(58) Field of Classification Search
   CPC . G06T 2207/10024; G06T 2207/20012; G06T 2207/20212; G06T 2207/30232; H04N 19/186; H04N 19/63; H04N 5/21; H04N 5/23267
   USPC ................ 382/166, 254, 300, 299, 284
   See application file for complete search history.

(56) References Cited

U.S. PATENT DOCUMENTS

| | | | |
|---|---|---|---|
| 8,805,121 B2* | 8/2014 | Kameyama | G06T 3/4053 382/299 |
| 2006/0257042 A1* | 11/2006 | Ofek | G06T 5/005 382/255 |
| 2008/0151067 A1 | 6/2008 | Yachi | |
| 2009/0252412 A1* | 10/2009 | Matsushita | G06T 5/009 382/167 |
| 2012/0321220 A1* | 12/2012 | Kameyama | G06T 3/4053 382/300 |
| 2013/0071040 A1* | 3/2013 | Jin | G06T 3/4053 382/254 |
| 2014/0002746 A1* | 1/2014 | Bai | H04N 5/21 348/607 |
| 2015/0161773 A1* | 6/2015 | Takahashi | H04N 5/2171 382/173 |
| 2016/0291917 A1* | 10/2016 | Hu | G06F 3/1446 |

\* cited by examiner

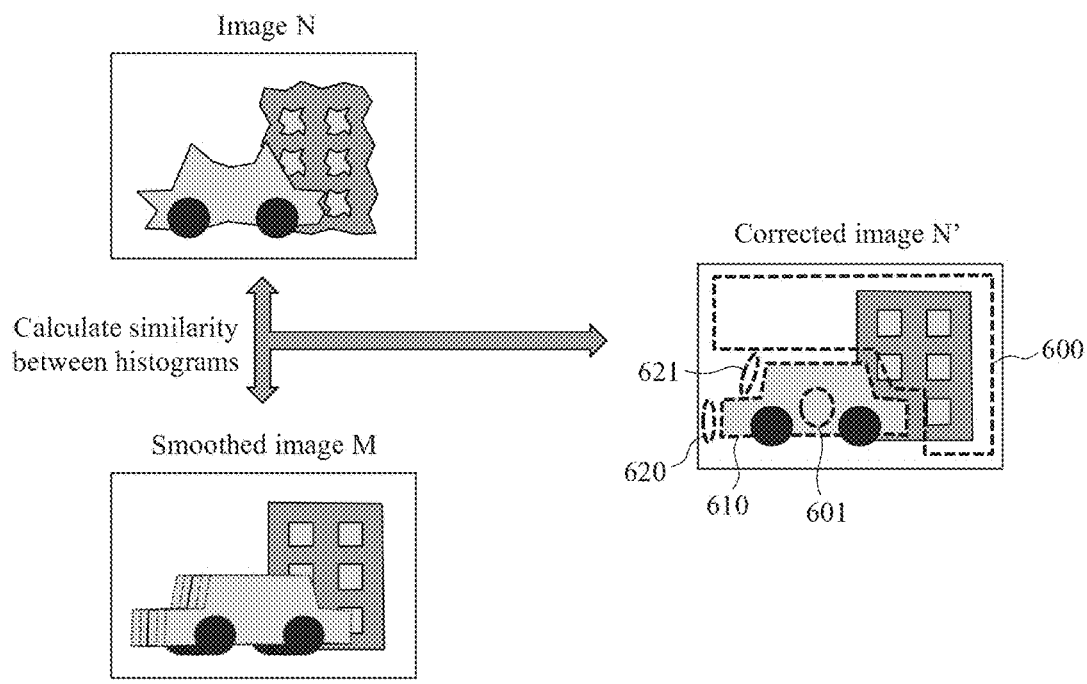

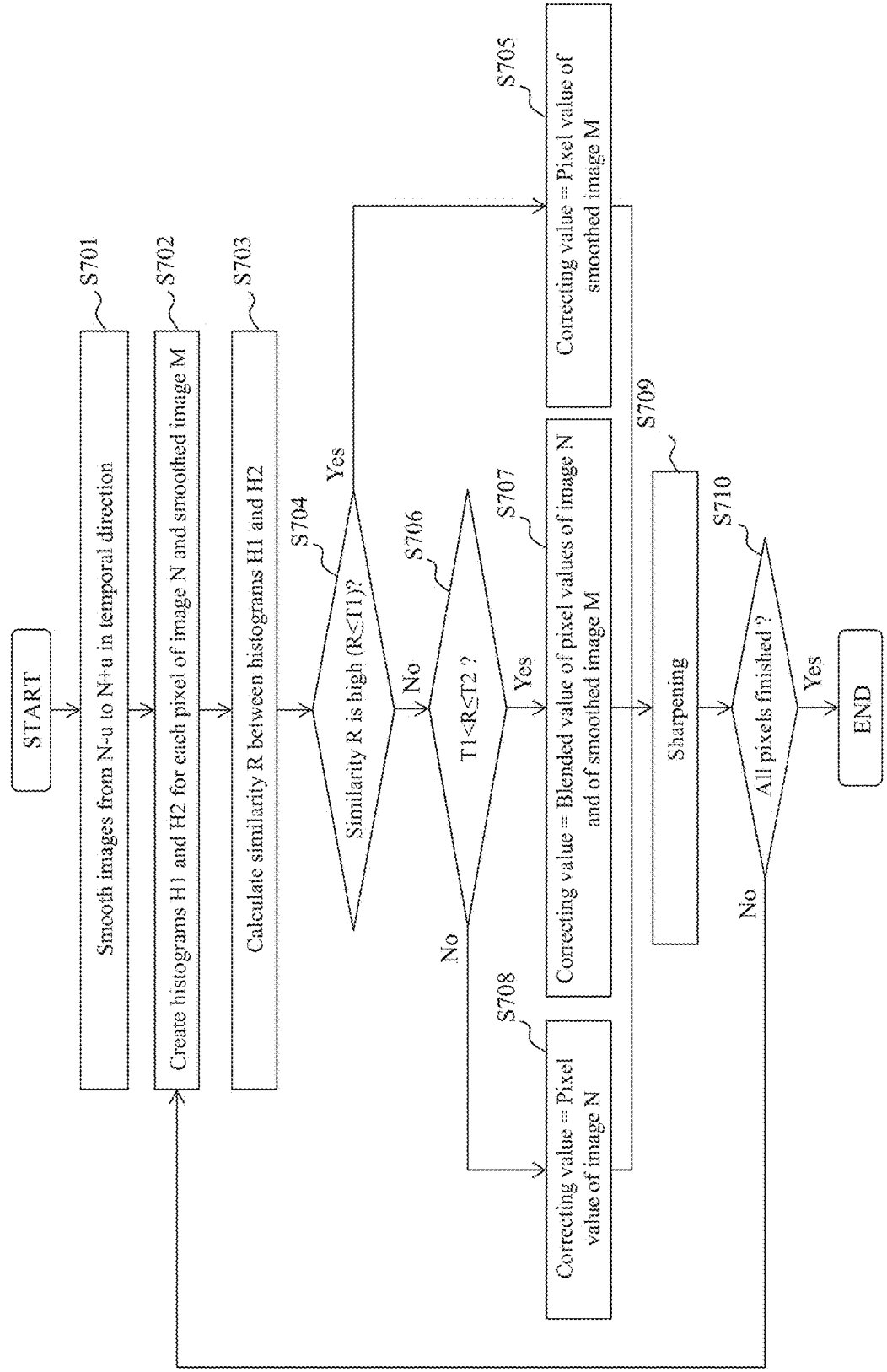

IMAGE PROCESSING DEVICE, IMAGING DEVICE, MONITORING SYSTEM, ENCODING DEVICE, IMAGE PROCESSING METHOD

TECHNICAL FIELD

The present invention relates to an image processing technique for reducing degrades in image quality due to such as heat hazes.

BACKGROUND ART

In recent years, in order to achieve safe and secure society, there are increasing needs for monitoring cameras that watch local societies on behalf of human eyes. It is important for monitoring cameras to improve visibility of videos. Image correction techniques such as blurring correction, gradation correction, or disturbance (rain, fog, smog, yellow sand, etc.) correction have been developed so far.

Heat haze is one of phenomena that reduces visibility of monitoring camera videos. Heat haze is a natural phenomenon that occurs from optical refraction that is caused by portions of atmosphere with different local densities mixed together. Heat haze is likely to be monitored when imaging asphalt of roads or car roofs using telescopic lens in high temperature days. When heat haze occurs, the imaged subject is monitored with deformed shapes. Accordingly, when reproducing the captured heat haze video, a specific portion in the captured image seems significantly wavered. Therefore, the visibility of the imaged subject is significantly reduced.

Patent Literature 1 listed below: determines whether a distortion occurs due to air fluctuation; if it is determined that the distortion due to air fluctuation occurs, creates a plurality of images by consecutive shooting; and adds up (averages) the plurality of images, thereby creating an image with the distortion being corrected.

CITATION LIST

Patent Literature

Patent Literature 1: JP Patent Publication (Kokai) 2012-182625 A

SUMMARY OF INVENTION

Technical Problem

However, if a plurality of past images captured by consecutive shooting is added (averaged), the image may be significantly degraded when the image includes a moving object, because the moving object could be imaged as a double image. In addition, no technique has been developed for correcting image distortions due to heat haze across the image including both a static region and a moving object. It is an important technical problem in the image correction field to establish a technique for correcting such image distortions.

The present invention is made in the light of the above-mentioned technical problem. It is an objective of the present invention to provide an image processing technique that can reduce heat haze across the image including both a static region and a moving object.

Solution to Problem

An image processing device according to the present invention: calculates a gradation distribution of a corrected frame and of a correcting frame respectively; changes a usage ratio between the corrected frame and the correcting frame; and corrects the corrected frame using the correcting frame.

Advantageous Effects of Invention

With the image processing device according to the present invention, it is possible to provide an image with high quality in which heat hazes across the image including both a static region and a moving object are reduced.

BRIEF DESCRIPTION OF DRAWINGS

FIG. 5 is a diagram showing an operation of an image corrector 14.

FIG. 6 is an example of a sharping filter used by a resolution enhancer 15.

FIG. 7 is a flowchart showing an operation of the image processing device 1.

DESCRIPTION OF EMBODIMENTS

Hereinafter, embodiments of the present invention will be described with reference to Figures. A same reference sign is assigned to same components within each Figure.

Embodiment 1

Figure 1:
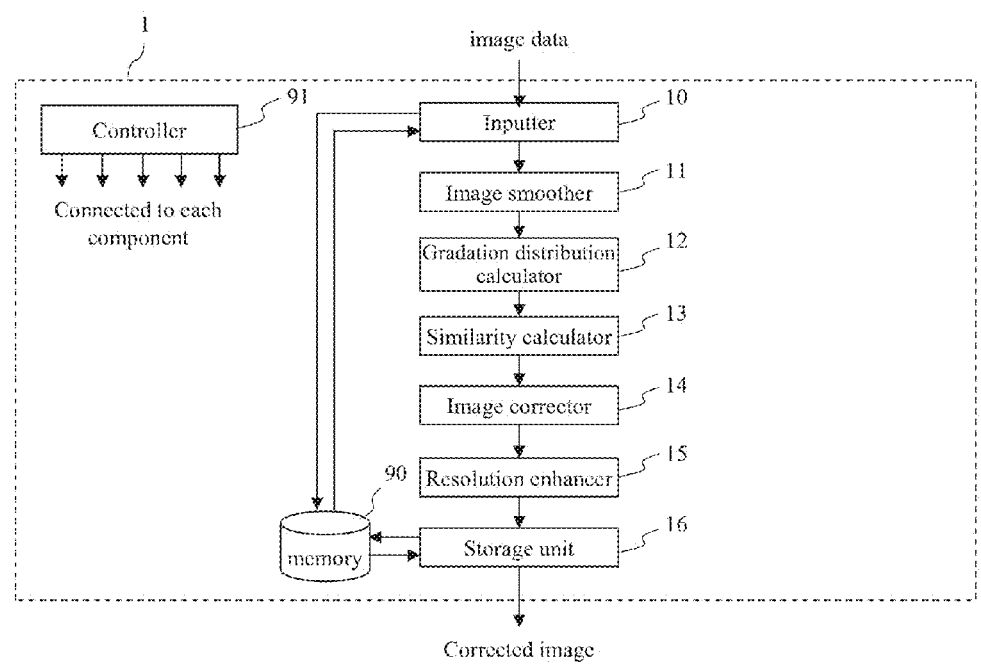
FIG. 1 is a functional block diagram of an image processing device 1 according to an embodiment 1.

FIG. 1 is a functional block diagram of an image processing device 1 according to an embodiment 1 of the present invention. The configuration of the image processing device 1 includes an inputter 10, an image smoother 11, a gradation distribution calculator 12, a similarity calculator 13, an image corrector 14, a resolution enhancer 15, a storage unit 16, and a controller 91.

The inputter 10 receives moving picture data captured by imaging means (not shown). For example, the inputter 10 may comprise image input ports or network connection ports and may be a tuner for TV broadcast. The inputter 10 may continuously acquire static image data of such as JPEG format, JPEG 2000 format, PNG format, or BMP format that is captured by imaging means such as monitoring cameras at a predetermined time interval, and may store a plurality of past, current, and future images as input images into a memory 90. The inputter 10 may extract static image data from moving image data of such as MotionJPEG format, MPEG format, H.264 format, or HD/SD format, and may store a plurality of past, current, and future images as input images into the memory 90. The inputter 10 can acquire a plurality of past, current, and future input images from the memory 90 using such as DMA (Direct Memory Access). The inputter 10 may be configured by imaging means that store a plurality of past, current, and future input images into the memory 90 through buses or through networks. The inputter 10 may, as described later, store a plurality of past, current, and future input images into the memory 90 that are previously stored in removable storage media.

When acquiring a plurality of past, current (time t), and future input images, the inputter 10 performs delay processing if necessary. The inputter 10 outputs, to the image smoother 11, a current image and images before and after the current image.

The image smoother 11 synthesizes a plurality of past, current, and future input images chronologically, thereby creating a smoothed image corresponding to time t. An example for creating the smoothed image will be described later with reference to FIG. 2.

For each of the input image of time t and the smoothed image, the gradation distribution calculator 12 calculates gradation distributions of each image region which is centered at pixels of each image. This process is performed at each pixel for each of the input image of time t and the smoothed image. An example of the gradation distribution will be described later with reference to FIG. 3.

The similarity calculator 13 calculates a similarity between a gradation distribution of the input image at time t and of the smoothed image calculated by the gradation distribution calculator 12. An example of the similarity between the gradation distributions will be described later with reference to FIG. 4.

The image corrector 14 corrects the input image of time t by synthesizing the input image of time t and the smoothed image. The synthesizing ratio between both images is modified depending on the similarity calculated by the similarity calculator 13. The correction above creates a corrected image of time t with reduced heat haze. An example of the correction process will be described later with reference to FIGS. 4-5.

The resolution enhancer 15 creates an image with enhanced resolution of time t from the corrected image of time t. An example of resolution enhancement will be described later with reference to FIG. 6.

The storage unit 16 stores the image of time t with enhanced resolution when storing an image of time t with enhanced resolution. The storage unit 16 stores the input image when not storing an image of time t with enhanced resolution.

The storage unit 16 can switch the image to be stored into the memory depending on operational modes. For example, if the mode is 1, the storage unit 16 stores a high resolution image S created by the resolution enhancer 15 into the memory 90, or alternatively outputs the high resolution image S to outside of the image processing device 1. If the mode is 0, the storage unit 16 does not store the high resolution image S into the memory 90, and outputs the input image to outside of the image processing device 1.

The controller 91 is connected to each component in the image processing device 1. Each of the components of the image processing device 1 operates autonomously, or alternatively operates under instruction of the controller 91.

Figure 2:
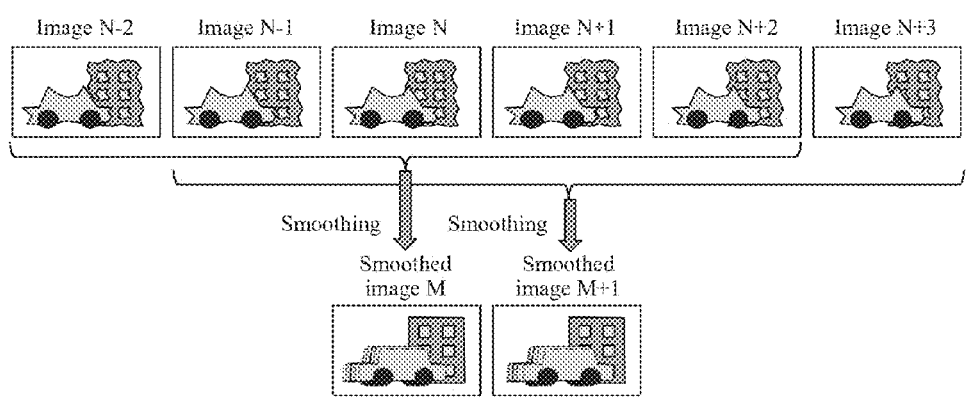
FIG. 2 is a diagram showing an operational example of an image smoother 11.

FIG. 2 is a diagram showing an operational example of the image smoother 11. FIG. 2 shows an example where smoothed images are created using past and future images (image N−2, image N−1, image N+1, image N+2) with an image N as a reference point and using the image N itself.

It is assumed that: a pixel value of the image N−2 is q1(i, j); a pixel value of the image N−1 is q2(i, j); a pixel value of the image N is q3(i, j); a pixel value of the image N+1 is q4(i, j); and a pixel value of the image N+2 is q5(i, j), each located at coordinate (i, j). It is also assumed that a pixel value of the smoothed image M at coordinate (i, j) is m(i, j). It is also assumed that p1-p5 are weight factors. The image smoother 11 creates, by synthesizing each of the images using Equation 1 below, the smoothed image M in which each of the images is smoothed chronologically.

[Formula 1]           Equation 1

$$m(i, j) = \sum_{i=1}^{D} (pi \times qi) \Big/ \sum_{i=1}^{D} pi$$

If there are five pieces of past, current, and future images for image synthesizing process, the parameter D in Equation 1 is 5. The pixel values in Equation 1 may be in any format. For example, the pixel values may be component values of three primary colors R (Red), G (Green), B (Blue) in RGB color space, or may be each component value of HSV color space (Hue, Saturation, Value).

It can be assumed that the displacement by which the imaged subject deforms due to heat haze follows Gaussian distribution statistically. Therefore, by smoothing pixels using a plurality of past and future images, it is possible to acquire an image in which the images subject has a shape close to its original shape. In addition, the reference image is reconfigured using past and future images within a limited range (In FIG. 2, D=5). Therefore, compared to a case smoothing the image by repeatedly synthesizing a plurality of past images for a long time span, it is possible to reduce significant effects from past images. Further, even if the input image includes a moving object, it is possible to create the smoothed image M that includes information being capable of reducing heat hazes of the moving object.

Figure 3:
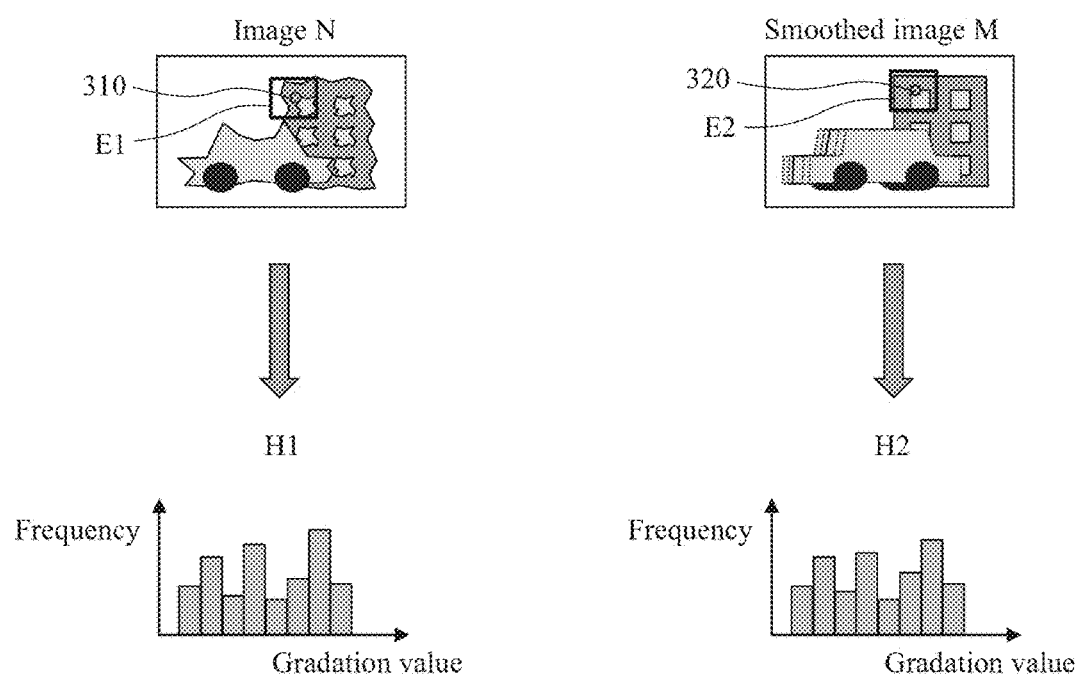
FIG. 3 is a diagram showing that a gradation distribution calculator 12 calculates a gradation distribution using pixels of peripheral regions around a target pixel.

FIG. 3 is a diagram showing that the gradation distribution calculator 12 calculates a gradation distribution using pixels of peripheral regions around a target pixel. The gradation distribution calculator 12 calculates a histogram H1 that represents a gradation distribution of an image region E1 (e.g. 32×32 pixels) including a target pixel 310 of the input image N corresponding to time t. Similarly, the gradation distribution calculator 12 calculates a histogram H2 that represents a gradation distribution of an image region E2 corresponding to the image region E1 in the smoothed image M. The horizontal axes of the histograms H1 and H2 represent gradation values, and the vertical axes represent frequency (number of appearance) of the gradation values. It applies to other histograms describes below.

When calculating the histograms H1 and H2, the gradation distribution calculator 12 aggregates a plurality of gradation values within a same class (horizontal axis), thereby rounding the gradation values. Since image fluctuations within a same gradation range are included within a same class, the histogram with rounded gradation values has a characteristic that the histogram is robust against deformations such as heat hazes. This can be utilized to distinguish image regions deformed by heat hazes from image regions deformed by moving objects. Hereinafter, specific examples will be described.

Figure 4:
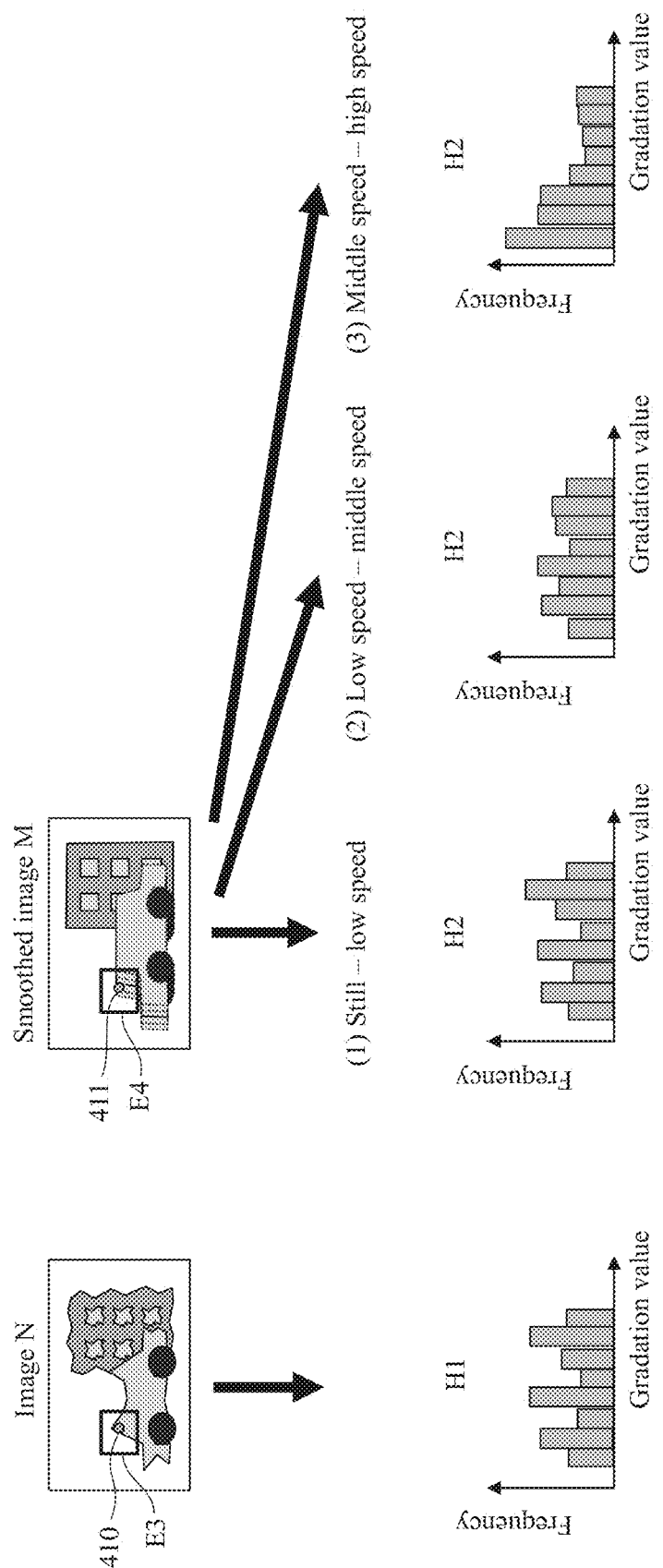
FIG. 4 is a diagram showing that a histogram H2 changes depending on conditions of moving objects included in past, current, and future images.

FIG. 4 is a diagram showing that the histogram H2 changes depending on conditions of moving objects included in past, current, and future images. It is assumed that the histogram H1 is for a region E3 that includes a target pixel 410 of the image N. The histogram H2 is for a region E4 of a target pixel 411 of the smoothed image M, and has different shapes depending on the speed of the moving object included in past, current, and future images.

When the movement pattern of the moving object is from still to low speed, the shape of the histogram H2 is similar to that of the histogram H1, as shown in FIG. 4 (1). When the movement pattern of the moving object is from low speed to middle speed, the image includes a small piece of picture information different from the moving object. Thus the shape of the histogram H2 is slightly different from that of the histogram H1, as shown in FIG. 4 (2). When the movement pattern of the moving object is from middle speed to high speed, the image includes a lot of picture information significantly different from the moving object. Thus the shape of the histogram H2 is much different from that of the histogram H1, as shown in FIG. 4 (3). Therefore, it is possible to perform a simplified inspection of the movement of the moving object within the image, by comparing the histogram H1 of the image N with the histogram of the smoothed image M.

Utilizing the above-mentioned characteristic of gradation distribution histogram, it is possible to distinguish an image fluctuation of static region due to heat hazes from a movement of moving object. In addition, by using the histogram H2 of each pixel in the smoothed image M created from past, current, and future images, it is possible to perform a simplified inspection of existence of moving object or its velocity.

The similarity calculator 13 calculates a similarity between the gradation distributions calculated by the gradation distribution calculator 12, e.g. between the histograms described with reference to FIGS. 3-4. For example, the similarity calculator 13: calculates a distance $B32(c)$ between the histograms utilizing Bhattacharyya distance for each of RGB components using Equation 2 below, for example; and calculates a similarity R using $B32(r)$ related to r component, $B32(g)$ related to g component, and $B32(b)$ related to b component. The similarity R corresponds to a distance between the histograms. Thus the smaller R is, the higher the similarity is. The parameter c in Equation 2 represents one of rgb.

[Formula 2]

$$B32(c) = \sqrt{1 - \frac{1}{HSUM}\sum_{I=0}^{31}\sqrt{HA(I) \times HB(I)}}$$

Equation 2

-continued $$R = \sqrt{B32(r)^2 + B32(g)^2 + B32(b)^2}$$

$HA(I)$: frequency of gradation value $I$ in histogram $A$ $HSUM$: total number of histogram bins FIG. 5 is a diagram showing an operation of the image corrector 14. The image corrector 14 determines pixel values of the corrected image using the input image N and the smoothed image M. Specifically, the image corrector 14: determines a correcting value for each pixel using the similarity R calculated by the similarity calculator 13 and using two thresholds T1 and T2 (T1<T2); and corrects the input image N using the correcting value.

If the similarity R≤T1 (the similarity between the histograms is high), the regions 600 and 601 in FIG. 5 correspond to such situation. This corresponds to a case when the movement pattern of the object in the image is from still to low speed. In this case, it is preferable to perform an intensive correction using the smoothed image M. Thus the pixel value of the smoothed image M is used as the correcting value.

If T2< the similarity R, the regions 620 and 621 in FIG. 5 correspond to such situation. This corresponds to a case when the movement pattern of the object in the image is from middle speed to high speed. In this case, if the correction is performed using the smoothed image M, a blurred image is acquired in which the movement of the moving object is smoothed. Thus the smoothed image M is not used and the pixel value of the input image N is used as the correcting value.

If T1< the similarity R≤T2, the boundary of the frame border of the region 610 in FIG. 5 corresponds to such situation. This corresponds to a case when the movement pattern of the object in the image is from low speed to middle speed. This is an intermediate case between the two cases above. Thus the image corrector 14 calculates the correcting value by blending the pixel values of the input image N and of the smoothed image M using Equation 3 below. In Equation 3, it is assumed that: n(i, j) is a pixel value of the image N at coordinate (i, j); m(i, j) is a pixel value of the smoothed image M at coordinate (i, j); d(i, j) is a blended value of each pixel value; e(i, j)=m(i, j), f(i, j)=n(i, j).

[Formula 3]

$$d(i,j)=(1-R)\times e(i,j)+R\times f(i,j)$$

Equation 3

FIG. 6 is an example of a sharping filter used by the resolution enhancer 15. The resolution enhancer 15 sharpens each correcting value using a filter such as shown in FIG. 6, for example, thereby creating the high resolution image S.

The smoothed image M may have low resolution. Therefore, for a region with small deformations such as the regions 600 and 601 in FIG. 5, the sharpness is intensified by setting K=1.0 in FIGS. 6 (1) and (2). For the boundary of the frame border of the region 610 in FIG. 5 where a blended value of the image N and the smoothed image M is used, an intermediate value is used such as K=0.75. For the regions 620 and 621 in FIG. 5 where the pixel value of the image N is used, K=0.5 so as not to intensify noises. By performing the above-mentioned processes for all pixels, it is possible to create the high resolution image S in which heat hazes are reduced across the image including a static region and a moving object, while improving the resolution.

FIG. 7 is a flowchart showing an operation of the image processing device 1. Hereinafter, each step in FIG. 7 will be described.

(FIG. 7: Step S701)

The inputter 10 acquires past, current, and future image frames, and outputs those image frames into the image smoother 11. The image smoother 11 calculates the smoothed image M. If the total number of past, current, and future images is 5, the suffix u in step 701 is 2.

(FIG. 7: Steps S702-S703)

The gradation distribution calculator 12 calculates the histograms H1 and H2 for each of pixels of the image N and of the smoothed image M (S702). The similarity calculator 13 calculates the similarity R between the histograms H1 and H2 (S703).

(FIG. 7: Step S704)

The image corrector 14 compares the similarity R with each of the thresholds. If R≤T1, the process proceeds to step 705. Otherwise the process proceeds to step 706.

(FIG. 7: Step S705)

The image corrector 14 sets the pixel value of the smoothed image M as the correcting value.

(FIG. 7: Steps S706-S708)

The image corrector 14 determines whether the similarity R satisfies the threshold T1<R≤T2. If the condition is satisfied, the process proceeds to step 707. Otherwise the process proceeds to step S708.

(FIG. 7: Steps S707-S708)

If the condition in step S706 is satisfied, the image corrector 14 sets a blended value of pixel values of the image N and of the smoothed image M as the correcting value according to Equation 3 (S707). If the condition is not satisfied, the image corrector 14 sets the pixel value of the image N as the correcting value (S708).

(FIG. 7: Steps S709-S710)

The resolution enhancer 15 creates the high resolution image S in which the resolution of the corrected image created by the image corrector 14 is improved (S709). The image corrector 14 and the resolution enhancer 15 repeat steps S702-S709 until the correcting value and pixel values with enhanced resolution are calculated for all pixels in the target image (S710).

Embodiment 1: Summary

As discussed thus far, the image processing device 1 according to the embodiment 1: creates the smoothed image M using past, current (the image N), and future images; creates the histograms H1 and H2 for each of pixels of the image N and of the smoothed image M; and changes the correcting value for each of pixels depending on the similarity R between the histograms H1 and H2. Accordingly, it is possible to create a corrected image in which heat haze is reduced within the image.

The image processing device 1 according to the embodiment 1 changes the correcting value for each of pixels depending on the similarity between the histograms H1 and H2 in which the gradation values are rounded. Accordingly, it is possible to distinguish image fluctuations at static region due to heat haze from movements of moving objects. In addition, it is possible to perform simplified inspections of movements of moving objects within the image. Thus it is possible to reduce heat hazes across the image that includes both static regions and moving objects.

Embodiment 2

The embodiment 1 describes that static regions and moving objects are distinguished from each other by comparing a gradation distribution histogram of the smoothed image M with that of the input image N. By using the smoothed image M, it is possible to save usage of storage capacity of the memory 90, as well as to reduce the frequency of comparison to suppress processing loads. On the other hand, if there is no strict hardware limit regarding those resources, it is possible to compare each image frame with the input image N without creating the smoothed image M. In an embodiment 2 of the present invention, a configuration example will be described where a gradation distribution histogram of the input image N is compared with that of image frames before and after the input image N.

Figure 8:
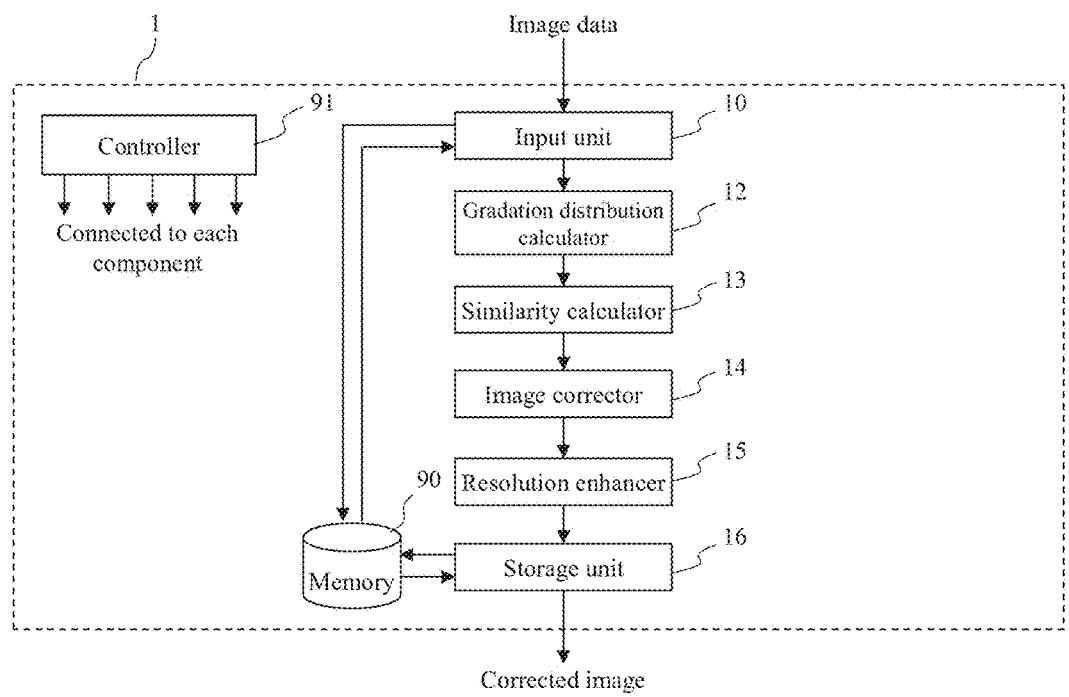
FIG. 8 is a functional block diagram of the image processing device 1 according to an embodiment 2.

FIG. 8 is a functional block diagram of the image processing device 1 according to the embodiment 2. In contrast to the configuration in the embodiment 1, the image processing device 1 according to the embodiment 2 does not include the image smoother 11. Other configurations are generally same as those of the embodiment 1. Thus differences of each component will be mainly described below.

Figure 9:
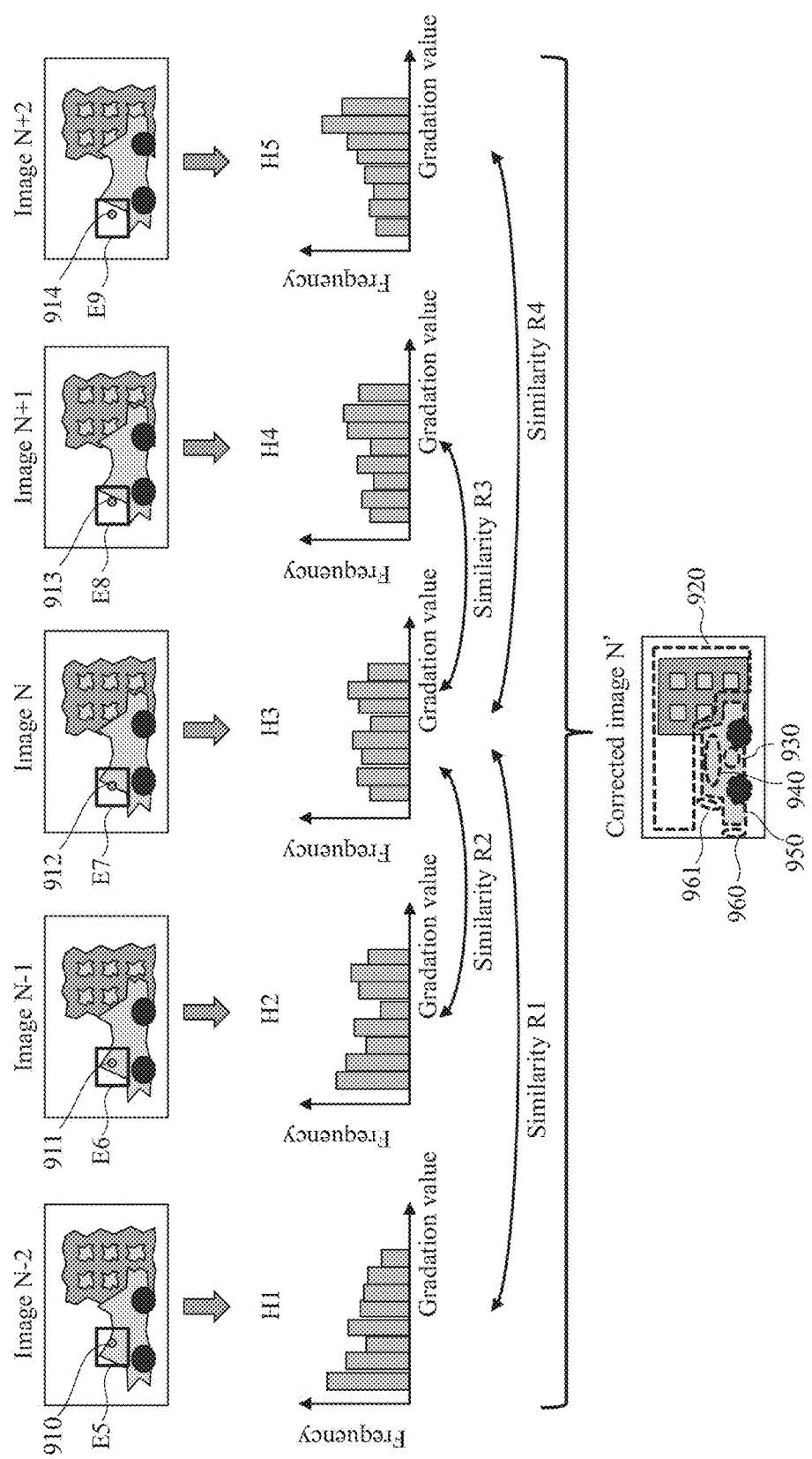
FIG. 9 is s diagram showing an operation of the gradation distribution calculator 12.

FIG. 9 is s diagram showing an operation of the gradation distribution calculator 12. The gradation distribution calculator 12 calculates gradation distributions using pixels of peripheral regions around a target pixel for each of past, current, and future images. In the example shown in FIG. 9, a histogram H1 is calculated using a partial image of a region E5 (e.g. 32×32 pixels) that includes a target pixel 910 of the image N−2. Similarly: a histogram H2 is calculated using a partial image of a region E6 that includes a target pixel 911 of the image N−1; a histogram H3 is calculated using a partial image of a region E7 that includes a target pixel 912 of the image N; a histogram H4 is calculated using a partial image of a region E8 that includes a target pixel 913 of the image N+1; and a histogram H5 is calculated using a partial image of a region E9 that includes a target pixel 914 of the image N+2. Each of the histograms has rounded gradation values as in the embodiment 1.

The similarity calculator 13 calculates similarities between gradation distributions calculated by the gradation distribution calculator 12, e.g. similarities between each of the histograms above. For example, using the histogram H3 as a reference, a distance B32($c$) and a similarity R1 between the histograms H1 and H3 are calculated for each of RGB according to Equation 2. Similarly: a distance B32($c$) and a similarity R2 between the histograms H2 and H3 are calculated; a distance B32($c$) and a similarity R3 between the histograms H4 and H3 are calculated; and a distance B32($c$) and a similarity R4 between the histograms H5 and H3 are calculated.

The image corrector 14 determines pixel values of the corrected image using the input image N and the images N−2, N−1, N+1, and N+2 before and after the input image N. Specifically, the image corrector 14: determines the correcting value for each of pixels using the similarities R1-R4 calculated by the similarity calculator 13 and two thresholds T1 and T2 (T1<T2); and corrects the input image N using the correcting value.

The image corrector 14: compares the similarity R1 between the histograms of the images N−2 and N with the thresholds; and calculates a correcting value C1 assuming that the image N is corrected using the image N−2. If the similarity R1≤T1 (the similarity between the histograms is high), the pixel value of the image N−2 is set as the correcting value C1. If T1< the similarity R1≤T2, a blended value of pixel values of the images N and N−2 is set as the correcting value C1. If T2< the similarity R1, the pixel value of the image N is set as the correcting value C1.

Similarly, the image corrector 14 determines correcting values C2-C4 for the similarities R2-R4 between the histograms of other images and the image N, respectively. The image corrector 14 calculates finally used correcting values according to Equation 4 using the correcting values C1-C4 and pixel value n of the image N. In Equation 4, if the total number of past, current, and future images is 5, A=4 and p6=1+A=5.

[Formula 4]

$$\text{correcting value} = \left(\sum_{i=1}^{A} Ci + n\right) / p6 \quad \text{Equation 4}$$

Instead of Equation 4 and without performing threshold comparison, the finally used correcting value may be calculated according to Equation 5 below using the similarities Ri (i=1 to 4) and pixel values of each image. In Equation 5, ai is pixel values of each image. a1 represents pixel values of the image N−2, a2 represents pixel values of the image N−1, a3 represents pixel values of the image N+1, and a4 represents pixel values of the image N+2.

[Formula 5]

$$\text{correcting value} = \left(\sum_{i=1}^{A}(1-Ri) \times ai + n\right) / \left(1 + \sum_{i=1}^{A}(1-Ri)\right) \quad \text{Equation 5}$$

According to the procedure above: heat haze is corrected in the regions 920 and 930 in FIG. 9 using all images (image N−2, image N−1, image N, image N+1, image N+2); heat haze is corrected in the regions 940 and at the boundary of the frame border 950 in FIG. 9 using images that satisfy the similarity Ri≤T1; and pixel values of the image N are set for the regions 960 and 961 in FIG. 9. Therefore, it is possible to correct heat hazes across the image that includes both static regions and moving objects.

If each of the correcting values is calculated by synthesizing each pixel value of a plurality of images, the image resolution may be reduced. Thus the resolution enhancer 15 sets K=1.0 in FIG. 9 for the regions 920 and 930 in FIG. 9. The resolution enhancer 15 sets K=0.75 for the region 940 and the boundary of the frame border 950 in FIG. 9, for example. The resolution enhancer 15 sets K=0.5 for the regions 960 and 961 in FIG. 9, for example.

Figure 10:
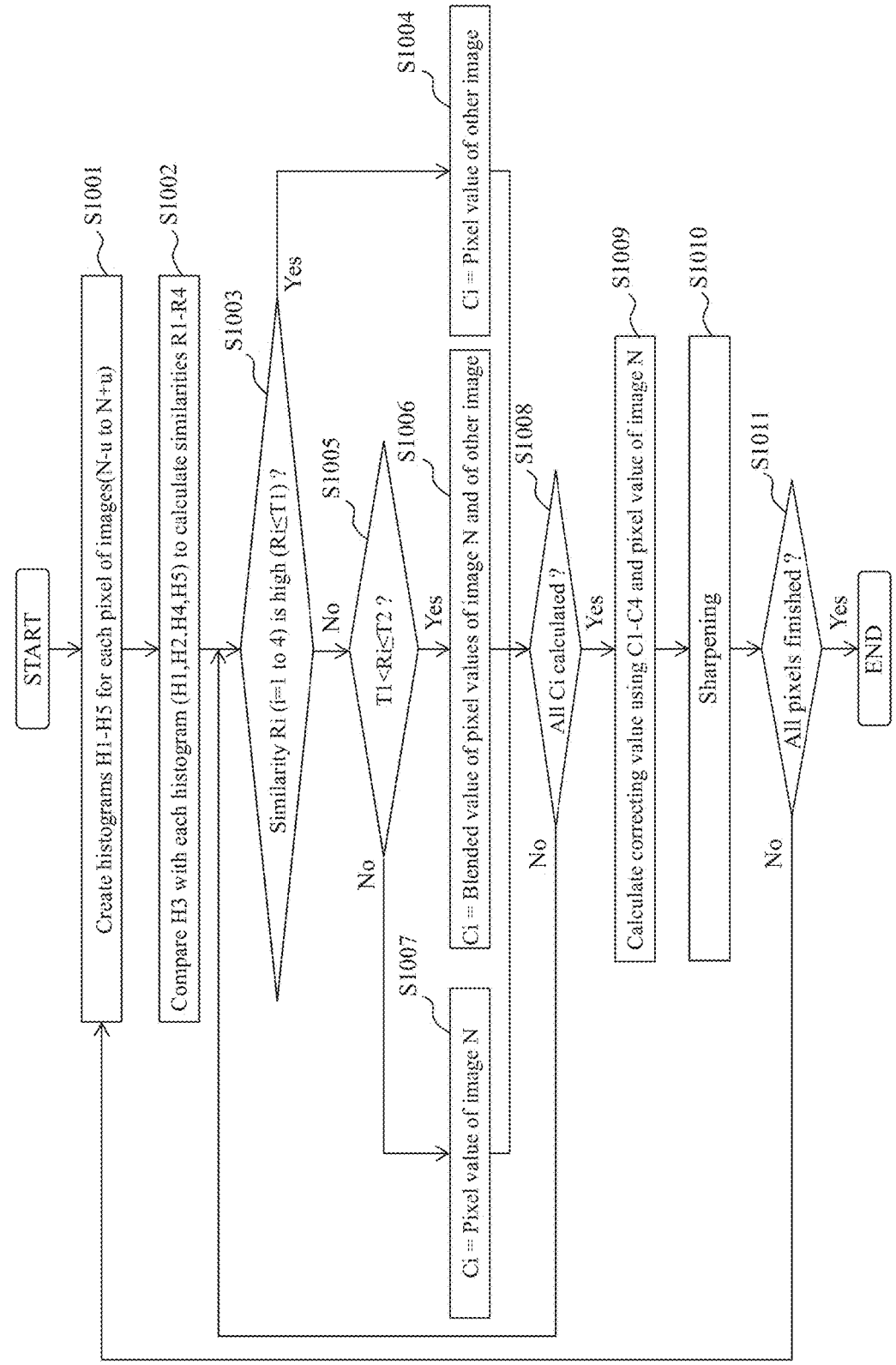
FIG. 10 is a flowchart showing an operation of the image processing device 1.

FIG. 10 is a flowchart showing an operation of the image processing device 1. Hereinafter, each step in FIG. 10 will be described.

(FIG. 10: Step S1001)

The gradation distribution calculator 12 calculates the histograms H1-H5 for each of pixels of past, current, and future images (the images N−2 to N+2) outputted from the inputter 10. If the total number of past, current, and future images is 5, the suffix u in step S1001 is 2.

(FIG. 10: Step S1002)

The similarity calculator 13 calculates the similarities R1-R4 between the histogram H3 and each of the histograms (H1, H2, H4, H5). The image corrector 14 initializes a suffix i used in calculating the correcting values C1-C4 (i=1). i=1 corresponds to the image N−2; i=2 corresponds to the image N−1; i=3 corresponds to the image N+1; and i=4 corresponds to the image N+2.

(FIG. 10: Step S1003)

The image corrector 14 determines whether the similarity Ri≤ threshold T1 is satisfied. If the condition is satisfied, the process proceeds to step S1004. Otherwise the process proceeds to step S1005.

(FIG. 10: Step S1004)

The image corrector 14 uses the pixel value of the other image (the image other than the image N) as the correcting value Ci.

(FIG. 10: Step S1005)

The image corrector 14 determines whether threshold T1<Ri≤T2 is satisfied. If the condition is satisfied, the process proceeds to step S1006. Otherwise the process proceeds to step S1007.

(FIG. 10: Step S1006)

The image corrector 14 uses a blended value of pixel value of the image N and pixel value of the other image (the image other than the image N) as the correcting value Ci. In other words, assuming that n(i, j) is a pixel value of the image N at coordinate (i, j) and n2(i, j) is a pixel value of the other image at coordinate (i, j), e(i, j)=n2(i, j) and f(i, j)=n(i, j) in Equation 3.

(FIG. 10: Step S1007)

The image corrector 14 uses the pixel value of the image N as the correcting value Ci.

(FIG. 10: Step S1008)

The image corrector 14 proceeds to step S1009 if all the correcting values Ci (i=1 to 4) are calculated. If there still is the correcting value Ci that has not been calculated yet, the image corrector 14 increments the suffix i and returns to step S1003.

(FIG. 10: Steps S1009-S1011)

The image corrector 14 calculates a finally used correcting value using Equations 4 or 5 (S1009). The resolution enhancer 15 calculates a value in which the resolution of the correcting value is enhanced (S1010). The image corrector 14 and the resolution enhancer 15 repeat steps S1001-S1010 until the correcting value and pixel values with enhanced resolution are calculated for all pixels in the target image (S1011).

Embodiment 2: Summary

As discussed thus far, the image processing device 1 according to the embodiment 2: creates the histograms H1-H5 for each pixel of past, current (the image N), and future images (the images N−2 to N+2); compares the histogram H3 with each of the histograms (H1, H2, H4, H5) to calculate the similarities R1-R4; and changes the correcting value for each of pixels depending on the similarities R1-R4. Accordingly, it is possible to more clearly calculate the difference between the histograms compared to the embodiment 1. In other words, the embodiment 1 compares the smoothed image M in which a plurality of images is smoothed with the image N. Thus it may be likely that the difference between the histograms is larger than that of the embodiment 2. According to the embodiment 2, it is possible to more clearly calculate the difference between the histograms, thereby selecting more appropriate correcting values.

The image processing device 1 according to the embodiment 2 determines the finally used correcting value using Equations 4 or 5. Accordingly, it is possible to dynamically change the number of images used for heat haze correction for each pixel. For example, the correcting value Ci calculated from the images N−2 to N+2 and the pixel value of the image N are evenly used when using Equation 4, and the pixel values of the images N−2 to N+2 are added with weight factors depending on the similarity Ri when using Equation 5. Therefore, it is possible to correct heat hazes of images including moving objects, using appropriate numbers of images for each of pixels. Further, only image(s) selected from the images N−2 to N+2 may be used according to some other appropriate rules.

Embodiment 3

The embodiments 1 and 2 distinguish image fluctuations due to heat haze from moving objects using histograms with rounded gradation values, thereby correcting heat hazes in images using appropriate numbers of images. In an embodiment 3 of the present invention, a configuration example will be described where: a moving object removal image T is created in which the moving object is previously removed from the input image N; and by comparing the moving object removal image T with the input image N, heat hazes are preferably removed in static regions where the moving object does not exist.

Figure 11:
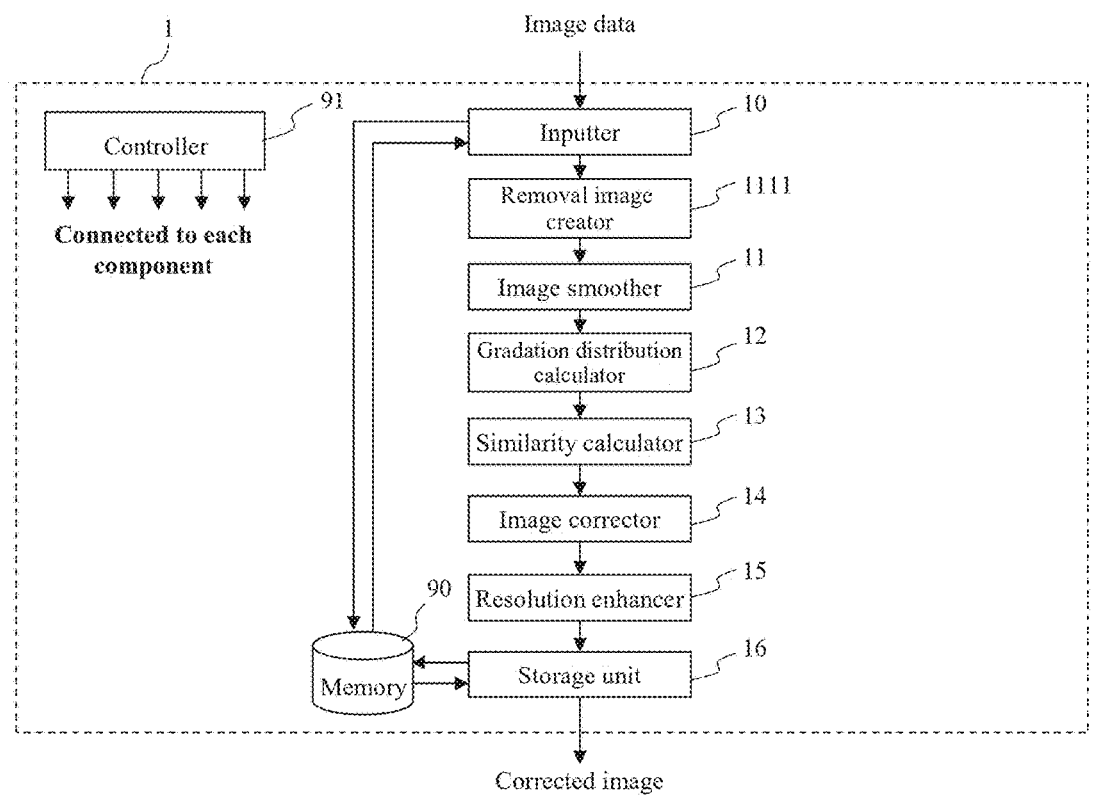
FIG. 11 is functional block diagram of the image processing device 1 according to an embodiment 3.

FIG. 11 is functional block diagram of the image processing device 1 according to the embodiment 3. The image processing device 1 according to the embodiment 3 includes a removal image creator 1111 in addition to the configurations described in the embodiments 1 or 2. Other configurations are generally same as those of the embodiments 1 and 2. Thus hereinafter the difference will be mainly described. The description below assumes the configuration of the embodiment 1 for the sake of convenience.

The removal image creator 1111 creates the moving object removal image T in which the moving object is removed from the input image N using Equation 6 below. In Equation 6, the parameter U has a value of 0<U<1.

[Formula 6]

$$h(i, j) = U \times v(i, j) + (1 - U) \times w(i, j) \qquad \text{Equation 6}$$

Figure 12:
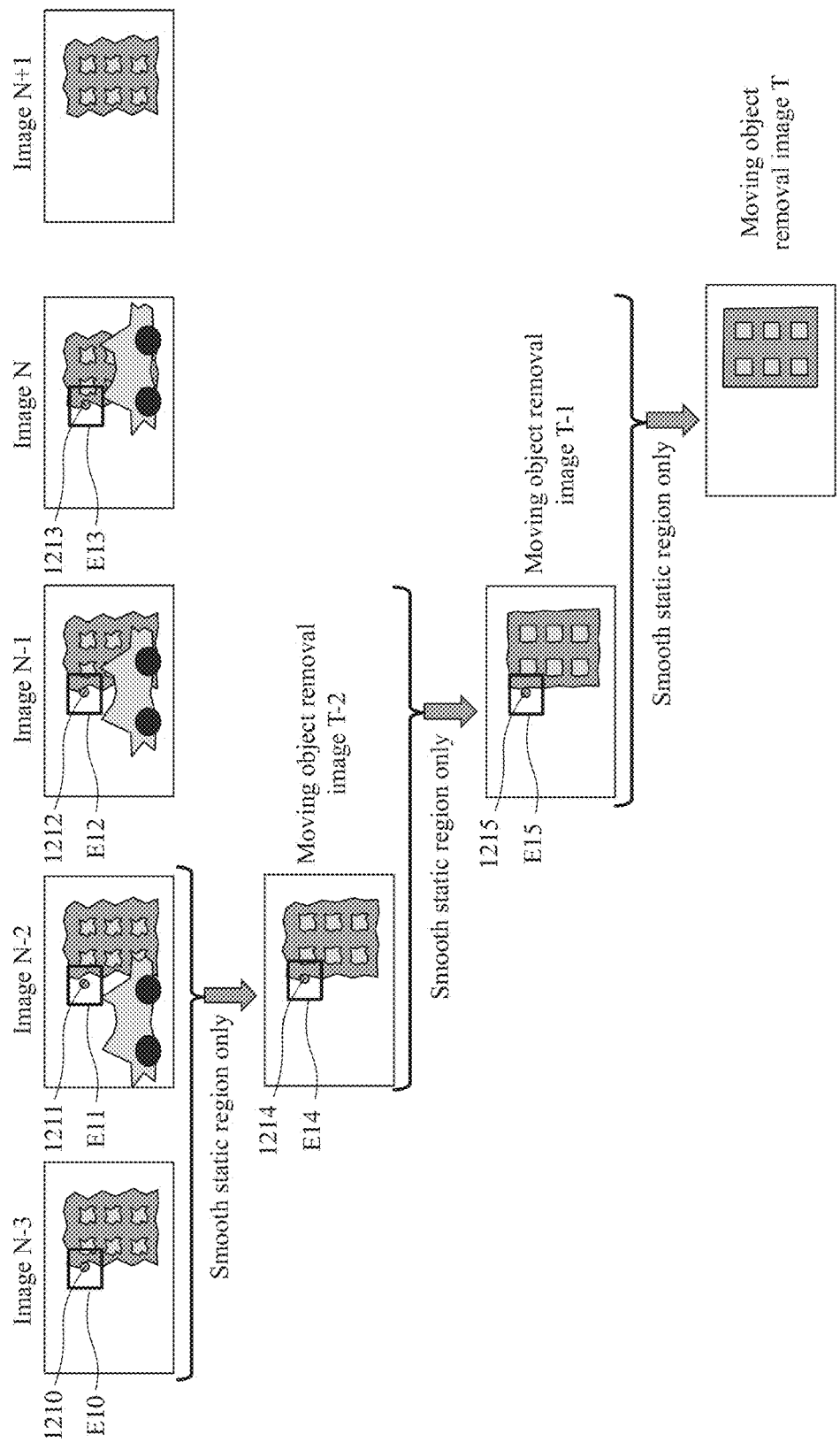
FIG. 12 is a diagram showing a processing example of a removal image creator 1111.

FIG. 12 is a diagram showing a processing example of the removal image creator 1111. The removal image creator 1111 calculates the histogram and the similarity R described in the embodiment 1, for a partial image of a region E10 that includes a target pixel 1210 (n3(i, j)) at coordinate (i, j) of the image N−3, and for a partial image of a region E11 that includes a target pixel 1211 (n2(i, j)) at coordinate (i, j) of the image N−2. If R≤ threshold T1, the removal image creator 1111 sets v(i, j)=n3(i, j) and w(i, j)=n2(i, j) in Equation 6, and calculates a correcting value h(i, j) at coordinate (i, j) using Equation 6. If R>threshold T1, the removal image creator 1111 uses pixel values of the past image (i.e. the image N−3) as the correcting value. The removal image creator 1111 performs the determination above for all pixels, thereby creating a moving object removal image T−2.

The removal image creator 1111 then performs the same process, for a partial image of a region E14 that includes a target pixel 1214 (t2(i, j)) at coordinate (i, j) of the moving object removal image T−2, and for a partial image of a region E12 that includes a target pixel 1212 (n1(i, j)) at coordinate (i, j) of the image N−1, thereby creating the moving object removal image T−1.

The removal image creator 1111 then performs the same process, for a partial image of a region E15 that includes a target pixel 1215 (t1(i, j)) at coordinate (i, j) of the moving object removal image T−1, and for a partial image of a region E13 that includes a target pixel 1213 (n(i, j)) at coordinate (i, j) of the image N, thereby creating the moving object removal image T.

According to the process above, only the static region of the image is repeatedly smoothed. Therefore, the heat haze at the static region of the moving object removal image T is significantly reduced. In FIG. 12, the process begins from the image N−3 where the moving object does not exist. However, even if the process begins from the image N−2, it is possible to create an image including the static region only, by repeating the same process after the image N. Therefore, it is not significantly important from which image the process begins.

The gradation distribution calculator 12 calculates, for each pixel, a histogram H6 of the moving object removal image T created by the moving object removal image creator 1111, a histogram H7 of the image N, and a histogram H8 of the smoothed image M created by the image smoother 11.

Figure 13:
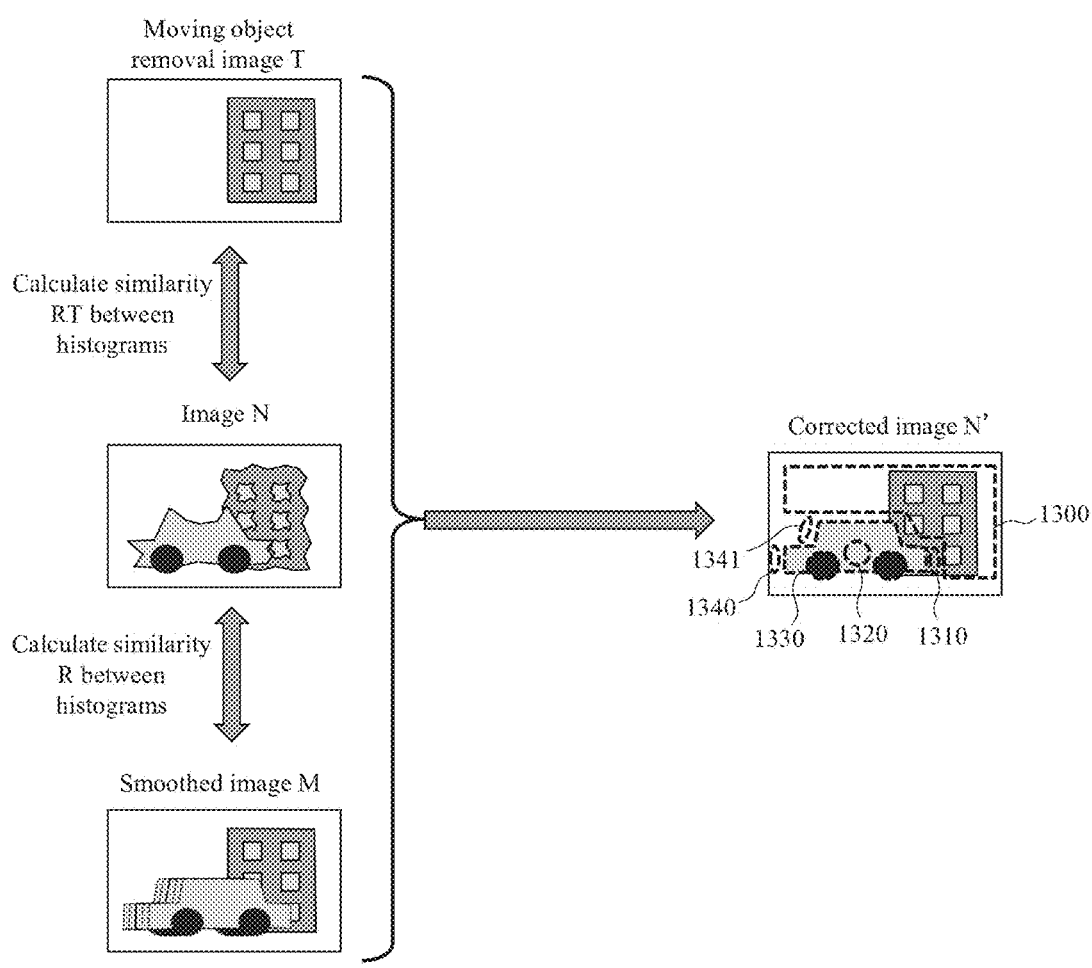
FIG. 13 is a diagram showing a process of a similarity calculator 13 and of the image corrector 14.

FIG. 13 is a diagram showing a process of the similarity calculator 13 and of the image corrector 14. The similarity calculator 13 calculates a distance B32(c) and the similarity R between the histograms H7 and H8 calculated by the gradation distribution calculator 12, for each of RGB. In addition, the similarity calculator 13 calculates a distance B32(c) and the similarity RT between the histograms H7 and H6 calculated by the gradation distribution calculator 12, for each of RGB.

The image corrector 14 determines pixel values of the corrected image using the input image N, the moving object removal image T, and the smoothed image M. Specifically, the image corrector 14: determines the correcting value for each pixel using the similarities R, RT calculated by the similarity calculator 13 and two thresholds T1, T2 (T1<T2); and corrects the input image N using the correcting value.

The image corrector 14: compares the similarity R calculated by the similarity calculator 13 with each of the thresholds; and calculates a correcting value C assuming that the image N is corrected using the smoothed image M. If the similarity R≤T1 (the similarity between the histograms is high), the pixel value of the smoothed image M is set as the correcting value C. If T1< the similarity R≤T2, a blended value of pixel values of the images N and of the smoothed image M is set as the correcting value C according to Equation 3. If the similarity R>T2, the pixel value of the image N is set as the correcting value C.

The image corrector 14 then: compares the similarity RT calculated by the similarity calculator 13 with each of the thresholds; and calculates a correcting value CT assuming that the image N is corrected by the moving object removal image T. If the similarity RT≤T1, the regions 1300 and 1320 in FIG. 13 correspond to such situation, and the pixel value of the moving object removal image T is set as the correcting value CT. If T1< the similarity RT≤T2, the regions 1310 and the boundary of the frame border 1330 in FIG. 13 correspond to such situation, and a blended value of the pixel value of the moving object removal image T and the correcting value C is set as the correcting value CT according to Equation 3. If the similarity RT>T2, the regions 1340 and 1341 in FIG. 13 correspond to such situation, and the correcting value C is set as the correcting value CT. The image corrector 14 uses the calculated correcting value CT as the finally determined correcting value.

The moving object removal image T or the smoothed image M may have low resolution. Therefore, for the regions 1300 and 1320 in FIG. 13, the resolution enhancer 15 sets K=1.0 in FIG. 13, for example. For the region 1310 and the boundary of the frame border of the region 1330 in FIG. 13, the resolution enhancer 15 sets K=0.75, for example. For the regions 1340 and 1341 in FIG. 13, the resolution enhancer 15 sets K=0.5 so as not to intensify noises, for example.

Figure 14:
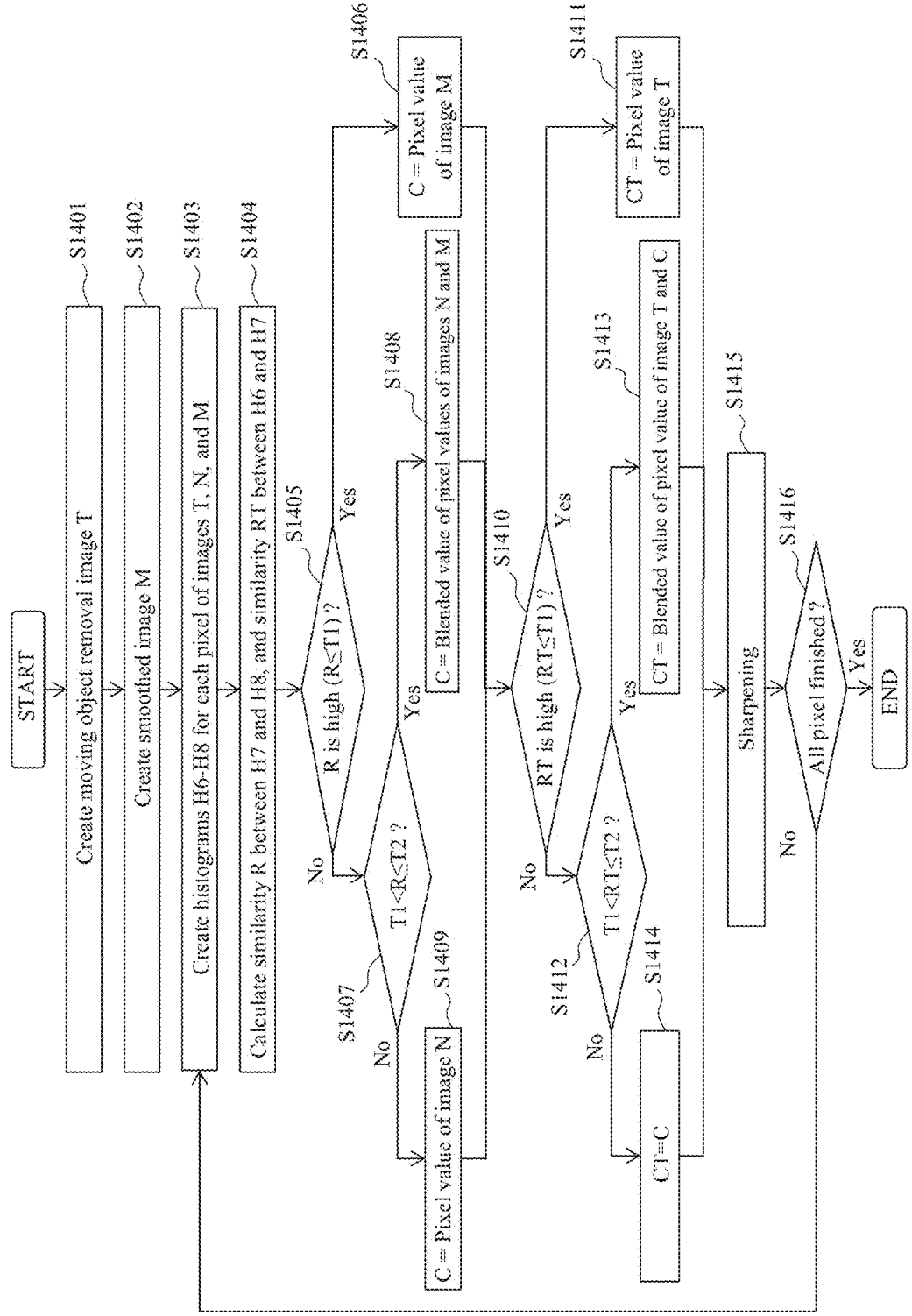
FIG. 14 is a flowchart showing an operation of the image processing device 1.

FIG. 14 is a flowchart showing an operation of the image processing device 1. Hereinafter, each step in FIG. 14 will be described.

(FIG. 14: Step S1401)

The removal image creator 1111 removes the moving object from the input image N according to the sequence described in FIG. 12, thereby creating the moving object removal image T. Image fluctuations due to heat haze at static regions are reduced within the moving object removal image T.

(FIG. 14: Step S1402)

The image smoother 11 creates the smoothed image M. Heat hazes at the moving object and at the border between the moving object and the static region are reduced within the smoothed image M.

(FIG. 14: Steps S1403-S1404)

The gradation distribution calculator 12 calculates the histogram H7 of the image N at time t, the histogram H8 of the smoothed image M, and the histogram H6 of the moving object removal image T (S1403). The similarity calculator 13 calculates the similarity R between the histograms H7 and H8, and the similarity RT between the histograms H7 and H6 (S1404).

(FIG. 14: Step S1405)

If R≤ threshold T1, the image corrector 14 proceeds to step S1406. Otherwise the image corrector 14 proceeds to step S1407.

(FIG. 14: Step S1406)

The image corrector 14 sets the pixel value of the smoothed image M as the correcting value C.

(FIG. 14: Step S1407)

The image corrector 14 determines whether the similarity R satisfies threshold T1<R≤T2. If the condition is satisfied, the process proceeds to step S1408. Otherwise the process proceeds to step S1409.

(FIG. 14: Step S1408)

The image corrector 14 sets a blended value of the pixel values of the smoothed image M and of the image N as the correcting value C. In other words, assuming that m(i, j) is a pixel value of the smoothed image M at coordinate (i, j) and n(i, j) is a pixel value of the image N at coordinate (i, j), the image corrector 14 sets e(i, j)=m(i, j) and f(i, j)=n(i, j) in Equation 3, thereby calculating a blended value.

(FIG. 14: Step S1409)

The image corrector 14 sets the pixel value of the image N as the correcting value C.

(FIG. 14: Step S1410)

The image corrector 14 determines whether the similarity RT satisfies RT≤ threshold T1. If the condition is satisfied, the process proceeds to step S1411. Otherwise the process proceeds to step S1412.

(FIG. 14: Step S1411)

The image corrector 14 sets the pixel value of the moving object removal image T as the correcting value CT.

(FIG. 14: Step S1412)

The image corrector 14 determines whether the similarity RT satisfies threshold T1<RT≤T2. If the condition is satisfied, the process proceeds to step S1413. Otherwise the process proceeds to step S1414.

(FIG. 14: Step S1413)

The image corrector 14 sets a blended value of the pixel value of the moving object removal image T and the correcting value C as the correcting value CT. In other words, assuming that t0(i, j) is a pixel value of the moving object removal image T at coordinate (i, j), e(i, j)=t0(i, j) and f(i, j)=the correcting value C in Equation 3.

(FIG. 14: Step S1414)

The image corrector 14 sets the correcting value C at coordinate (i, j) as the correcting value CT. The image corrector 14 employs the correcting value CT calculated in the foregoing process as the finally used correcting value.

(FIG. 14: Steps S1415-S1416)

The resolution enhancer 15 calculates a value in which the resolution of the correcting value is enhanced (S1415). The image corrector 14 and the resolution enhancer 15 repeat steps S1403-S1415 until the correcting value and pixel values with enhanced resolution are calculated for all pixels in the target image (S1416).

Embodiment 3: Summary

As discussed thus far, the image processing device 1 according to the embodiment 3: creates the moving object removal image T in addition to the smoothed image M; and changes the correcting value for each pixel depending on the similarity R (of the histograms) between the input image N and the smoothed image M and on the similarity RT (of the histograms) between the input image N and the moving object removal image T. By introducing the pixel value of the moving object removal image T as the correcting value CT, it is possible to preferably reduce heat hazes of the static region within the input image N.

Among the pixel value of the moving object removal image T, the pixel value of the image N at time t, and the pixel value of the smoothed image M, the image processing device 1 according to the embodiment 3 uses the most appropriate one as the finally used correcting value CT depending on the similarities. Accordingly, it is possible to further effectively suppress heat hazes at static regions of the image, as well as to calculate the corrected image where heat hazes are reduced across the image that includes both static regions and moving objects.

Embodiment 4

Figure 15:
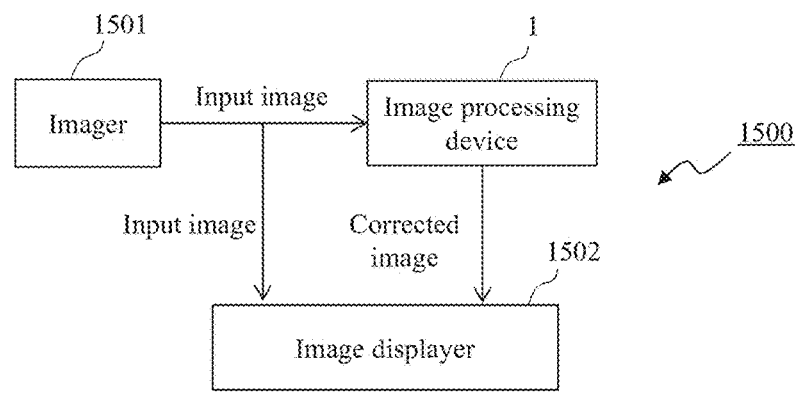
FIG. 15 is a functional block diagram of an imaging device 1500 according to an embodiment 4.

FIG. 15 is a functional block diagram of an imaging device 1500 according to an embodiment 4 of the present invention. The imaging device 1500 includes an imager 1501, an image processing device 1, and an image displayer 1502. The imager 1501 is an imaging device that receives light irradiated from the imaged subject, and that converts the received optical image into image data. The image processing device 1 is the image processing device 1 according to one of the embodiments 1-3. The image processing device 1 receives the image data captured by the imager 1501 to correct heat hazes. The image displayer 1502 is a device such as display that displays the corrected image outputted from the image processing device 1.

The image displayer 1502 switches images depending on operational modes. For example, if the mode is 1, the image displayer 1502 displays the corrected image with reduced heat hazes. If the mode is 0, the image displayer 1502 displays the input image.

With the imaging device 1500 according to the embodiment 4, it is possible to provide an imaging device that displays to the photographer the corrected image in which heat hazes are reduced across the image that includes both static regions and moving objects.

Embodiment 5

Figure 16:
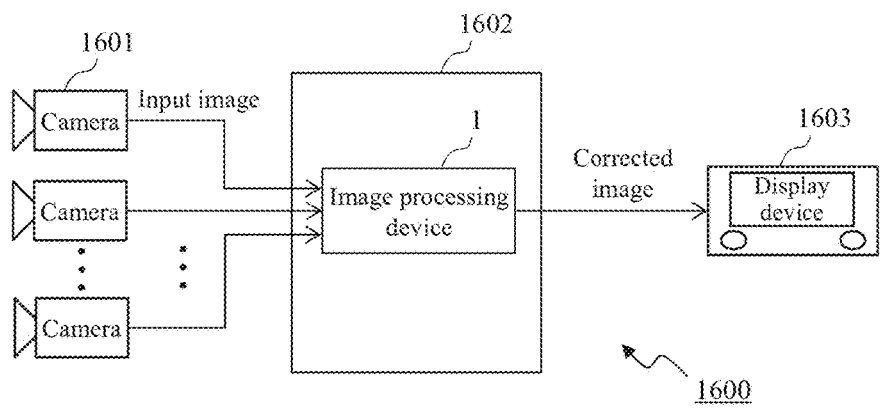
FIG. 16 is a functional block diagram of a monitoring system 1600 according to an embodiment 5.

FIG. 16 is a functional block diagram of a monitoring system 1600 according to an embodiment 5 of the present invention. The monitoring system 1600 includes an imaging device 1601, an image processing device 1, a server 1602, and a display device 1603. The imaging device 1601 is an imaging device such as one or more of monitoring cameras that capture image data. The image processing device 1 is the image processing device 1 according to one of the embodiments 1-3. The image processing device 1 receives the image data captured by the imaging device 1601 to correct heat hazes. The server 1602 is a computer that equips the image processing device 1. The display device 1603 is a device such as display that displays the corrected image outputted from the image processing device 1.

It is possible to connect, through networks such as Internet, between the imaging device 1601 and the server 1602 and between the server 1602 and the display device 1603, depending on the physical allocations between the monitored location and the monitoring operator.

With the monitoring system 1600 according to the embodiment 5, it is possible to provide a monitoring system that displays to the monitoring operator the corrected image in which heat hazes are reduced across the image that includes both static regions and moving objects.

Embodiment 6

Figure 17:
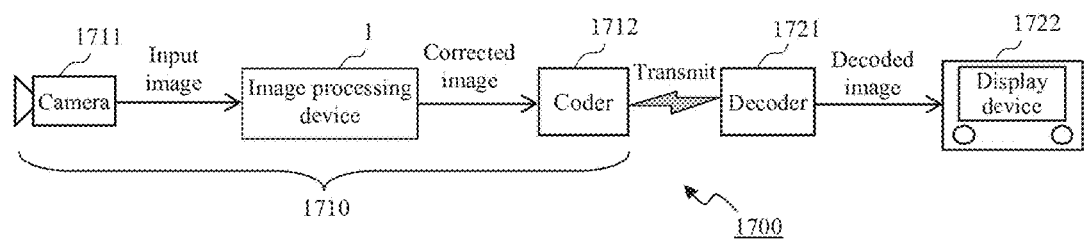
FIG. 17 is a functional block diagram of a coding-decoding system 1700 according to an embodiment 6.

FIG. 17 is a functional block diagram of a coding-decoding system 1700 according to an embodiment 6 of the present invention. The coding-decoding system 1700 includes a coding device 1710, a decoder 1721, and a display device 1722. The coding device 1710 includes an imaging device 1711, an image processing device 1, and a coder 1712.

The imaging device 1711 is an imaging device such as monitoring camera that captures image data. The image processing device 1 is the image processing device 1 according to one of the embodiments 1-3. The image processing device 1 receives the image data captured by the imaging device 1711 to correct heat hazes. The coder 1712 encodes the corrected image data outputted from the image processing device 1, and transmits the encoded image data toward the decoder 1721 through a network. The decoder 1721 decodes the transmitted corrected image data. The display device 1722 displays the image decoded by the decoder 1721.

With the coding-decoding system 1700 according to the embodiment 6, it is possible to provide a coding-decoding system that displays the decoded image in which heat hazes are reduced across the image that includes both static regions and moving objects. In addition, due to the reduced heat haze within the image, the difference between images transmitted by the coder 1712 is small, and thus the coding efficiency is improved.

Embodiment 7

In an embodiment 7 of the present invention, examples with modified components of the embodiments 1-6 will be described.

It is described above that the image smoother 11 creates the smoothed image M using five pieces of past, current, and future images. However, the number of images used for creating the smoothed image M is not limited to 5. It also applies to the number of images for comparing with the image N in the embodiment 2. In addition, the image smoother 11 may create the smoothed image M using past images within a certain period and current image, or using future images within a certain period and current image. This also achieves the same advantageous effect.

It is describes above that the similarity calculator 13 calculates the similarity between the histograms utilizing Bhattacharyya distance. However, the similarity calculator 13 may calculate the similarity using other comparing methods for calculating the distance between the histograms such as a total sum of difference of frequencies between the histograms. This also achieves the same advantageous effect.

It is described above that the resolution enhancer 15 uses FIG. 6 as the sharpening filter. However, the resolution enhancer 15 may enhance the resolution of image with reduced heat haze using other sharpening filters or using conventional super resolution techniques. This also achieves the same advantageous effect.

The embodiment 3 describes that the image corrector 14 uses the moving object removal image T when calculating the correcting value CT. However, the image corrector 14 may use the moving object removal image T−1 in FIG. 12. When using the moving object removal image T−1, the image corrector 14 sets the pixel value of the moving object removal image T−1 as the correcting value CT in step S1411 of FIG. 14, and sets a blended value of the pixel value of the moving object removal image T−1 and the correcting value C as the correcting value CT in step S1413 of FIG. 14.

The present invention is not limited to the embodiments, and various modified examples are included. The embodiments are described in detail to describe the present invention in an easily understood manner, and the embodiments are not necessarily limited to the embodiments that include all configurations described above. Part of the configuration of an embodiment can be replaced by the configuration of another embodiment. The configuration of an embodiment can be added to the configuration of another embodiment. Addition, deletion, and replacement of other configurations are also possible for part of the configurations of the embodiments.

The configurations, etc., the functions, the processing units, the processing means, etc., may be realized by hardware such as by designing part or all of the components by an integrated circuit. A processor may interpret and execute programs for realizing the functions to realize the configurations, the functions, etc., by software. Information, such as programs, tables, and files, for realizing the functions can be stored in a recording device, such as a memory, a hard disk, and an SSD (Solid State Drive), or in a recording medium, such as an IC card, an SD card, and a DVD.

REFERENCE SIGNS LIST

1 image processing device
10 inputter
11 image smoother
12 gradation distribution calculator
13 similarity calculator
14 image corrector
15 resolution enhancer
16 storage unit
91 controller
1111 removal image creator
1500 imaging device
1600 monitoring system
1700 coding-decoding system

The invention claimed is:

1. An image processing device comprising:
   an inputter that receives a plurality of image frames captured chronologically;
   a gradation calculator, that calculates a first gradation distribution of a first image region in a target frame to be corrected among the plurality of image frames, and that calculates a second gradation distribution of a second image region corresponding to the first image region in a correcting frame used for correcting the target frame among the plurality of image frames;
   a similarity calculator that calculates a first similarity between the first and second gradation distributions;
   an image corrector that corrects the target frame using the correcting frame; and
   an output unit that outputs the target frame corrected by the image corrector,
   wherein the image corrector changes a usage ratio between the target frame and the correcting frame depending on the first similarity, and then corrects the target frame using the correcting frame,
   wherein the gradation calculator uses, among the plurality of image frames, at least one of an image frame captured before the target frame and an image frame captured after the target frame as the correcting frame,
   wherein, when the first similarity is at or below a first threshold, the image corrector employs a pixel value of the correcting frame as a first correcting value used for correcting the target frame,
   wherein, when the first similarity is above a second threshold, the image corrector employs a pixel value of the target frame as the first correcting value, and
   wherein, when the first similarity is above the first threshold and is at or below the second threshold, the image corrector calculates a pixel value by adding a pixel value of the correcting frame and a pixel value of the target frame with a weight factor depending on the first similarity, and then employs the calculated pixel value as the first correcting value.

2. The image processing device according to claim 1, further comprising:
   a removal image creator that creates a moving object removal image in which an image of a moving object included in the image frames is removed,
   wherein the gradation calculator calculates a third gradation distribution of a third image region corresponding to the first image region in the moving object removal image,
   wherein the similarity calculator calculates a second similarity between the first and third gradation distributions, and
   wherein the image corrector changes a usage ratio between the target frame, the correcting frame, and the moving object removal image depending on the first and second similarities, and then corrects the target frame using the correcting frame and the moving object removal image.

3. The image processing device according to claim 2,
   wherein the removal image creator determines, from the image frames, an image region including the moving object and an image region not including the moving object based on a magnitude of the second similarity, and
   wherein the removal image creator repeats a process, for the image region not including the moving object, of smoothing a plurality of image frames with different captured times, and, for the image region including the moving object, keeping an older one and discarding a newer one among the plurality of image frames with different captured times, thereby creating the moving object removal image.

4. The image processing device according to claim 3,
   wherein the image corrector corrects the target frame using a second correcting value calculated by overwriting the first correcting value depending on the second similarity,
   wherein, when the second similarity is at or below a third threshold, the image corrector employs a pixel value of the moving object removal image as the second correcting value,
   wherein, when the second similarity is above a fourth threshold, the image corrector employs the first correcting value as the second correcting value, and
   wherein, when the second similarity is above the third threshold and is at or below the fourth threshold, the image corrector calculates a pixel value by adding the first correcting value and a pixel value of the moving object removal image with a weight factor depending on the second similarity, and then employs the calculated pixel value as the second correcting value.

5. The image processing device according to claim 1,
   wherein the gradation calculator respectively calculates, as the first and second gradation distributions, first and second histograms having gradation values of the target and correcting frame as class values, and
   wherein the gradation calculator aggregates a plurality of gradation values within one unit of the class values for the first and second histograms.

6. The image processing device according to claim 1, further comprising:
   a resolution enhancer that sharpens the target frame corrected by the image corrector.

7. The image processing device according to claim 1, further comprising:
   an image smoother that creates a smoothed image in which a plurality of the image frames received by the inputter are synthesized chronologically, and
   wherein the gradation calculator and the image corrector use the smoothed image as the correcting frame.

8. The image processing device according to claim 1,
   wherein the similarity calculator employs, as the correcting frame, a plurality of the image frames captured before and after the target frame, and then calculates the first similarity for each of a plurality of the correcting frames, and
   wherein the image corrector calculates the first correcting value for each of the correcting frames, and then corrects the target frame using at least one of the first correcting values.

9. The image processing device according to claim 8,
   wherein the image corrector corrects the target frame using a pixel value calculated by averaging each of the first correcting values or using a pixel value calculated by adding each of the first correcting values with a weight factor depending on the first similarity.

10. An imaging device comprising:
    the image processing device according to claim 1; and
    an imaging unit that images image data and that outputs an image frame of the image data to the image processing device.

11. A monitoring system comprising:
the image processing device according to claim 1; and
an imaging unit that images image data and that outputs an image frame of the image data to the image processing device through a network.

12. An encoding device comprising:
the image processing device according to claim 1;
an imaging unit that images image data and that outputs an image frame of the image data to the image processing device; and
an encoder that encodes the corrected target frame outputted from the image processing device.

13. An image processing method comprising:
an input step of receiving a plurality of image frames captured chronologically;
a gradation calculation step of calculating a first gradation distribution of a first image region in a target frame to be corrected among the plurality of image frames, and of calculating a second gradation distribution of a second image region corresponding to the first image region in a correcting frame used for correcting the target frame among the plurality of image frames;
a similarity calculation step of calculating a first similarity between the first and second gradation distributions;
an image correction step of correcting the target frame using the correcting frame; and
an output step of outputting the target frame corrected in the image correction step,
wherein the image correction step further comprises a step of changing a usage ratio between the target frame and the correcting frame depending on the first similarity, and then correcting the target frame using the correcting frame,
wherein the gradation step uses, among the plurality of image frames, at least one of an image frame captured before the target frame and an image frame captured after the target frame as the correcting frame,
wherein, when the first similarity is at or below a first threshold, the image correction step includes employing a pixel value of the correcting frame as a first correcting value used for correcting the target frame,
wherein, when the first similarity is above a second threshold, the image correction step includes employing a pixel value of the target frame as the first correcting value, and
wherein, when the first similarity is above the first threshold and is at or below the second threshold, the image correction step includes calculating a pixel value by adding a pixel value of the correcting frame and a pixel value of the target frame with a weight factor depending on the first similarity, and then employs the calculated pixel value as the first correcting value.

* * * * *